United States Patent [19]
Luo et al.

[11] Patent Number: 5,491,652
[45] Date of Patent: Feb. 13, 1996

[54] FAST FOURIER TRANSFORM ADDRESS GENERATOR

[75] Inventors: Wenzhe Luo; Jiasheng Xu, both of Beijing, China

[73] Assignee: United Microelectronics Corporation, Taiwan

[21] Appl. No.: 327,284

[22] Filed: Oct. 21, 1994

[51] Int. Cl.[6] .................................................. G06F 15/00
[52] U.S. Cl. ............................................................ 364/726
[58] Field of Search ...................................... 364/725–726

[56] References Cited

U.S. PATENT DOCUMENTS

| | | | |
|---|---|---|---|
| 4,393,457 | 7/1983 | New | 364/726 |
| 5,233,551 | 8/1993 | White | 364/726 |
| 5,365,469 | 11/1994 | Mercy | 364/726 |

*Primary Examiner*—Tan V. Mai
*Attorney, Agent, or Firm*—Curtis, Morris & Safford

[57] ABSTRACT

A for Fast Fourier Transform (FFT) address generator utilizes a butterfly counter to count a butterfly count for each butterfly stage of FFT in numerical sequence; and a stage counter to count a stage count for the butterfly stage of FFT in bit-shifting manner. A data address logic is coupled to the butterfly counter and the stage counter to receive the butterfly count and the stage count, and to generate a data address according to a first regularized logic function. A twiddle factor address logic is coupled to the butterfly counter and the stage counter to receive the butterfly count and the stage count, and to generate a twiddle factor address according to a second regularized logic function.

6 Claims, 4 Drawing Sheets

5,491,652

FAST FOURIER TRANSFORM ADDRESS GENERATOR

BACKGROUND OF THE INVENTION

The present invention relates to an FFT (Fast Fourier Transform) address generator, and more particularly to an FFT address generator which has simpler structure and higher speed than conventional models.

The FFT is probably one of the most important algorithms in digital signal processing (DSP) applications. There are two approaches for computing the transform: software implemented on a programmable DSP, and dedicated FFT processor development. Real-time DSP favors the use of the latter, which offers parallel processing capability.

An FFT processor hardware system mainly consists of two parts: the butterfly processor for arithmetic operation, and an address generator for the generation of read/write addresses. The address generator provides addresses of the operation data as well as the so-called "twiddle factors" $W_N^k$ for each butterfly calculation. As is known, the FFT butterfly computation operates on data in sets of r points, where r is called the radix. A P-point FFT uses P/r butterfly units per stage for $\log_r P$ stages. The computational result of one butterfly stage is the input data of next butterfly stage.

To meet the requirements of different signal flow graphs and different point numbers, the logic design of an FFT address generator is complicated, and arithmetic-logic-unit-like structures are often used. Addresses are generated through the execution of instructions. The propagation delay time of conventional FFT address generators is relatively high.

SUMMARY OF THE INVENTION

Through the study of FFT signal flow graphs, it has been found by the present inventors that in FFT calculation, the rules of binary address generation for the data and twiddle factors $W_N^k$ could be expressed in Boolean expressions to simplify the electrical circuit design of the FFT address generator. Therefore, the primary object of the present invention is to provide an FFT address generator which has the advantages of smaller number of transistors and higher speed.

In accordance with the present invention, an address generator for a $2^m$-point FFT comprises:

a butterfly counting mechanism for counting a butterfly count $(B_{m-2}B_{m-3} \ldots B_0)$ for each butterfly stage of FFT in numerical sequence;

a stage counting mechanism for counting a stage count $(R_{m-1}R_{m-2} \ldots R_0)$ for the butterfly stage of FFT in bit-shifting manner;

a data address logic mechanism, coupled to the butterfly counting mechanism and the stage counting mechanism, for receiving the butterfly count $(B_{m-2}B_{m-3} \ldots B_0)$ and the stage count $(R_{m-1}R_{m-2} \ldots R_0)$, and for generating a data address $(A_{m-1}A_{m-2} \ldots A_0)$ according to a first predetermined logic function:

$$\begin{cases} A_{m-1} = R_{m-1}S + (R_{m-2} + R_{m-3} + \ldots + R_0)B_{m-2} \\ \vdots \\ A_{m-k} = (R_{m-1} + \ldots + R_{m-k+1})B_{m-k} + R_{m-k}S + \\ \qquad (R_{m-k-1} + \ldots + R_0)B_{m-k-1} \\ \vdots \\ A_0 = (R_{m-1} + R_{m-2} + \ldots + R_1)B_0 + R_0S \end{cases}$$

wherein S is a select signal for the upper/lower data addresses in a butterfly of FFT; and a twiddle factor address logic mechanism, coupled to the butterfly counting mechanism and the stage counting mechanism for receiving the butterfly count $(B_{m-2}B_{m-3} \ldots B_0)$ and the stage count $(R_{m-1}R_{m-2} \ldots R_0)$, and for generating a twiddle factor address $(C_{m-2} C_{m-3} \ldots C_0)$ according to a second predetermined logic function:

$(C_{m-2}C_{m-3} \ldots C_0) = R_0(000 \ldots 0) + R_1(B_0 00 \ldots 0) + R_2(B_0 0 \ldots 0) + \ldots + R_{m-1}(B_{m-2}B_{m-3}B_{m-4} \ldots B_0)$ According to one feature of the present invention, the data address logic mechanism includes a bit-reversing mechanism for reversing the bits of the stage count $(R_{m-1}R_{m-2} \ldots R_0)$ before performing the data address generation logic according to the first predetermined logic function, in case of the decimation-in-frequency FFT; and the twiddle factor address logic mechanism includes a bit-reversing mechanism for reversing the bits of the butterfly count $(B_{m-2}B_{m-3} \ldots B_0)$ before performing the twiddle factor address generation logic function according to the second predetermined logic, in case of the DIF FFT.

According to another feature of the present invention, the FFT address generator further comprises a butterfly full logic mechanism, coupled to the butterfly counting mechanism, for receiving the butterfly count $(B_{m-2}B_{m-3} \ldots B_0)$, and for generating a full signal to flag the last butterfly calculation in a certain butterfly stage of FFT. The FFT address generator also comprises a stage full logic mechanism, coupled to the stage counting mechanism, for receiving the stage count $(R_{m1}R_{m2} \ldots R_0)$, and for generating a last signal to flag the last butterfly stage of FFT.

According to further feature of the present invention, the data address logic mechanism utilizes a pass-transistor array structure to implement the first predetermined logic function. The twiddle factor address logic mechanism also utilizes a pass-transistor array structure to implement the second predetermined logic function.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
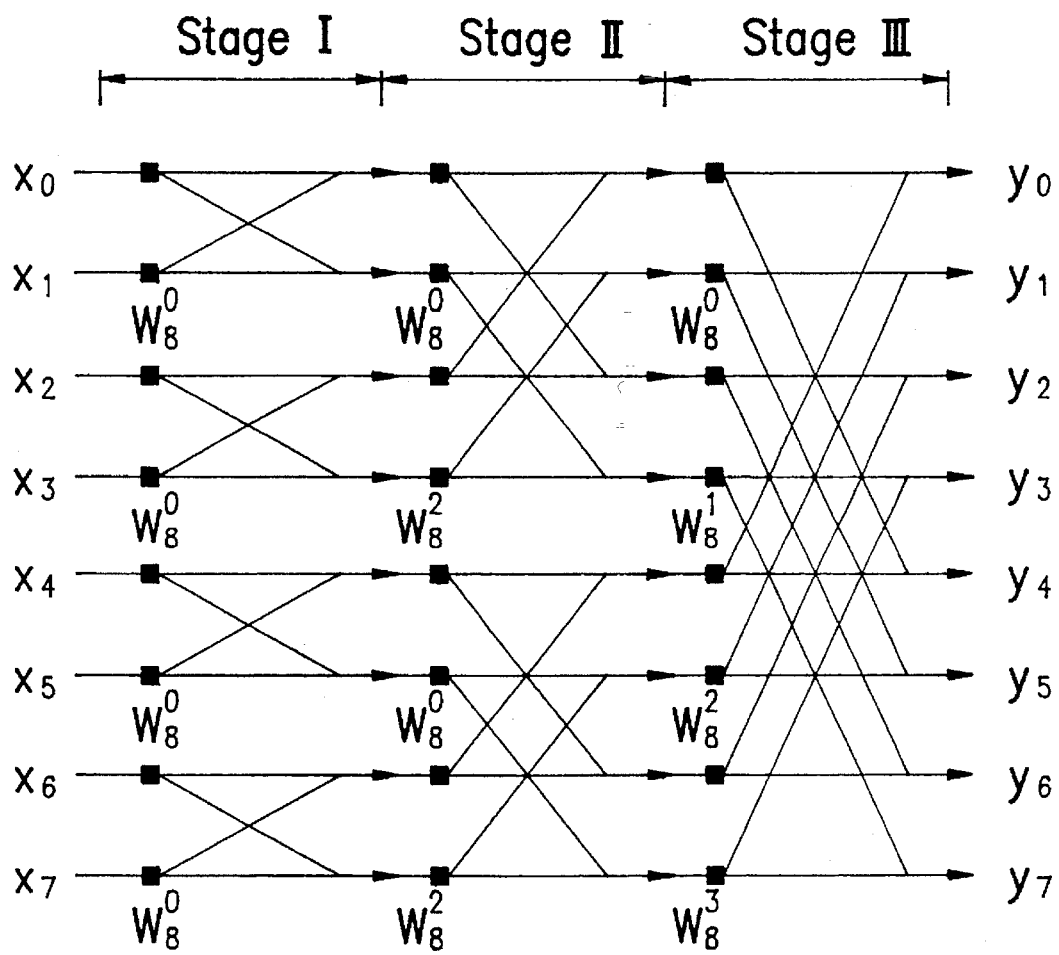
FIG. 1 shows a well-known decimation-in-time type of signal flow graph for an 8-point radix-2 FFT processor.
Figure 2:
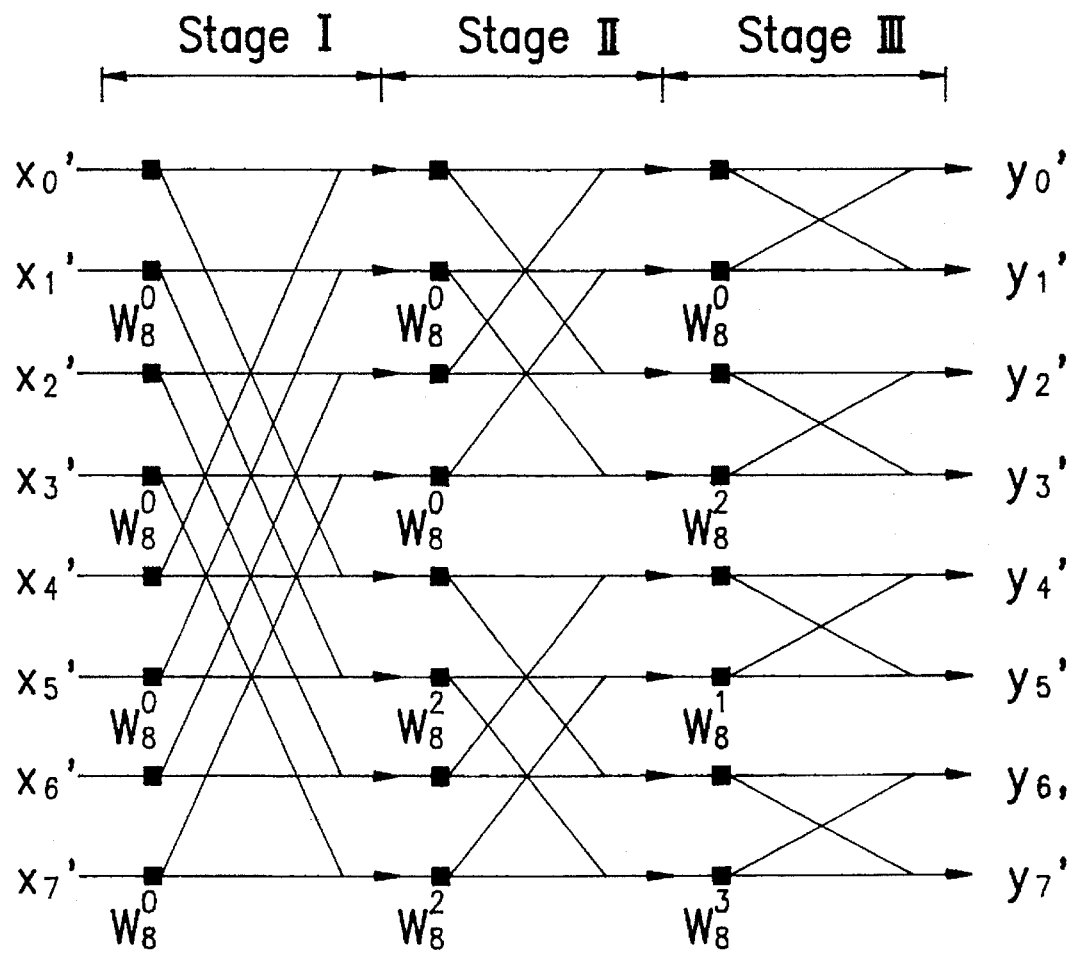
FIG. 2 shows a well-known decimation-in-frequency type of signal flow graph for an 8-point radix-2 FFT processor.

On the basis of FFT in-place calculation, the basic function of an FFT processor hardware system is the provision of two types of signal flow graphs of radix-2: decimation-in-time (DIT) and decimation-in-frequency (DIF). The DIT and DIF types of signal flow graphs have different structures and should be discussed separately. For radix-2 decimation, a $2^{m-1}$ point FFT has m stages of decimation, and each stage involves $2^{m-1}$ butterfly calculation. FIG. 1 shows a well-known DIT-type signal flow graph for an 8-point radix-2 FFT, and FIG. 2 shows a well-known DIF-type signal flow graph for the 8-point radix-2 FFT. As clearly seen in FIGS. 1 and 2, the 8-point FFT has three butterfly stages I, II, and III, and each stage involves four butterfly calculations. In the same stage, the butterflies can be calculated in an arbitrary order, but in order to synthesize the rules of address generation, it is assumed that the butterflies are calculated from top to bottom sequentially.

At first, the DIT-type signal flow graph for 8-point radix-2 FFT is considered, and then the general rules of address generation are concluded. The data addresses ($\alpha_2 \alpha_1 \alpha_0$) for butterfly calculation in each stage of decimation are listed in Table 1.

TABLE 1

The data addresses ($a_2 a_1 a_0$)
for butterfly calculation in FIG. 1

| | 1st stage | | 2nd stage | | 3rd stage | |
|---|---|---|---|---|---|---|
| | X | X' | X | X' | X | X' |
| butterfly count ($b_1, b_0$) | | | | | | |
| 0 0 | 0 0 0 | 0 0 1 | 0 0 0 | 0 1 0 | 0 0 0 | 1 0 0 |
| 0 1 | 0 1 0 | 0 1 1 | 0 0 1 | 0 1 1 | 0 0 1 | 1 0 1 |
| 1 0 | 1 0 0 | 1 0 1 | 1 0 0 | 1 1 0 | 0 1 0 | 1 1 0 |
| 1 1 | 1 1 0 | 1 1 1 | 1 0 1 | 1 1 1 | 0 1 1 | 1 1 1 |
| stage count ($r_2 r_1 r_0$) | 0 0 1 | | 0 1 0 | | 1 0 0 | |

(X, X': the upper/lower data in the butterfly)

In order to analyze the rule, the addresses are written in binary form. The X column in Table 1 lists the addresses of upper data in the butterfly while the X' column lists the addresses of lower data. The butterfly calculation is counted in each stage of decimation in numerical sequence as in the left column ($b_1 b_0$). For example, the butterfly count ($b_1 b_0$) counts from (00), (01), (10) to (1 1) in each stage. The stage of decimation is counted in bit-shifting manner as in the bottom row ($r_2 r_1 r_0$). For example, the stage count ($r_2 r_1 r_0$) counts from (001), (010) to (100) for first stage to third stage. As noted, only one bit of the stage count ($r_2 r_1 r_0$) is "1", and the other bits are "0" in all conditions.

By observing and analyzing Table 1, it is found that there are regularities in the bits of data address ($\alpha_2 \alpha_1 \alpha_0$) with respect to the butterfly count ($b_1 b_0$) and the stage count ($r_2 r_1 r_0$). For the addresses of the upper data, the bit in the data address ($\alpha_2 \alpha_1 \alpha_0$) corresponding to the "1" bit in the stage count ($r_2 r_1 r_0$) is always "0," and the other bits in the data address ($\alpha_2 \alpha_1 \alpha_0$) are identical to the butterfly count ($b_1 b_0$). For the addresses of the lower data, the bit in the data address ($\alpha_2 \alpha_1 \alpha_0$) corresponding to the "1" bit in the stage count ($r_2 r_1 r_0$) is always "1," and the other bits in the data address ($\alpha_2 \alpha_1 \alpha_0$) are identical to the butterfly count ($b_1 b_0$). Thus, the Boolean expressions of the data address ($\alpha_2 \alpha_1 \alpha_0$) can be synthesized as follows:

$$a_2 = r_2 s + (r_1 + r_0) b_1$$
$$a_1 = r_2 b_1 + r_1 s + r_0 b_0 \quad (1)$$
$$a_0 = (r_2 + r_1) b_0 + r_0 s$$

wherein s is a select signal for the upper/lower data addresses in a butterfly. The select signal s equals "0" for the address of the upper data in a butterfly, and equals "1" for the address of the lower data.

The complex constant $W_N^k$, called a "twiddle factor," is stored in read only memory (ROM), addressed by the binary values of the k (or some auxiliary "zero" bits are added to its end). The DIT-type signal flow graph shown in FIG. 1 is still used for consideration, and it is assumed that there are only four complex constants: $W_N^0$, $W_N^1$, $W_N^2$, $W_N^3$ stored within the $W_N^k$ ROM in the addresses (00) (01), (10) and (11) respectively. The addresses ($c_1 c_0$) of twiddle factors $W_N^k$ for butterfly calculation in each stage of decimation are listed in Table 2.

TABLE 2

The addresses ($c_1 c_0$) of $W_N^k$
for butterfly calculation in FIG. 1

| $b_1 b_0$ + '0 0' | 1st stage | 2nd stage | 3rd stage |
|---|---|---|---|
| 0 0 0 0 | 0 0 | 0 0 | 0 0 |
| 0 1 0 0 | 0 0 | 1 0 | 0 1 |
| 1 0 0 0 | 0 0 | 0 0 | 1 0 |
| 1 1 0 0 | 0 0 | 1 0 | 1 1 |
| $r_2 r_1 r_0$ | 0 0 1 | 0 1 0 | 1 0 0 |

For convenience of analysis, two auxiliary "zero" bits (00) are added to the end of the butterfly count value ($b_1 b_0$) to form the eventual butterfly count ($b_1 b_0$ 0 0).

By studying the regularity of the $W_N^k$ address ($c_1 c_0$) in Table 2, it is found as follows:

For each stage of decimation, the $W_N^k$ address ($c_1 c_0$) is always equal to two sequential bits in the butterfly count ($b_1 b_0 0 0$). As the decimation goes to the next stage, the equivalent two bits of the $W_N^k$ address ($c_1 c_0$) in the butterfly count ($b_1 b_0$ 0 0) go forward by a bit. For example, as $r_0=1$, ($c_1 c_0$)=(0 0); as $r_1=1$, ($c_1 c_0$)=($b_0$ 0); and as $r_2=1$, ($c_1 c_0$)=($b_1 b_0$), as clearly seen in Table 2.

From this regularity, the Boolean expression of the $W_N^k$ address ($c_1 c_0$) can be written together as a simple formula:

$$(c_1 c_0) = r_0(00) + r_1(b_0 0) + r_2(b_1 b_0) \quad (2)$$

After the above-described regularities of the data and $W_N^k$ addresses for the DIT-type FFT of 8 points are synthesized, the equations (1) and (2) can be directly expanded to general conditions. For a decimation-in-time FFT of $2^m$ points, the stage count requires m bits ($R_{m-1} R_{m-2} \ldots R_0$), and counts in bit-shifting manner by using, for example, a left-shift register. The butterfly count requires m−1 bits ($B_{m-2} B_{m-3} \ldots B_0$), and counts in numerical sequence by using, for example, an up counter. The data addresses have m bits ($A_{m-1} A_{m-2} \ldots A_0$), and the $W_N^k$ addresses have m−1 bits ($C_{m-2} C_{m-3} \ldots C_0$).

The equation (1) is expanded as:

$$\left.\begin{array}{l} A_{m-1} = R_{m-1}S + (R_{m-2} + R_{m-3} + \ldots + R_0)B_{m-2} \\ \vdots \\ A_{m-k} = (R_{m-1} + \ldots + R_{m-k+1})B_{m-k} + R_{m-k}S + \\ \qquad (R_{m-k-1} + \ldots + R_0)B_{m-k-1} \\ \vdots \\ A_0 = (R_{m-1} + R_{m-2} + \ldots + R_1)B_0 + R_0S \end{array}\right\} \quad (3)$$

wherein S is a select signal for the upper/lower data addresses in a butterfly. The select signal S equals "0" for the address of the upper data in a butterfly, and equals "1" for the address of the lower data.

The equation (2) is expanded as:

$$(C_{m-2}C_{m-3} \ldots C_0) = R_0(000 \ldots 0) + R_1(B_000 \ldots 0) + R_2(B_1B_00 \ldots 0) + \ldots + R_{m-1}(B_{m-2}B_{m-3}B_{m-4} \ldots B_0) \quad (4)$$

Through comparison of two types of signal flow graphs, it is found that DIF FFT can also utilize the above-described address generation logic of DIT FFT with a little modification. For a DIF FFT of $2^m$ points:

a. Reverse the bits of the stage count R[m−1:0] while the butterfly count B[m−2:0] remains unchanged, and using the same address generation logic, i.e. Eq. (3), the data address of DIF FFT can be attained simply.

b. Reverse the bits of the butterfly count B[m−2:0] while the stage count R[m−1:0] remains unchanged, using the same address generation logic, i.e. Eq. (4), the constant $W_N^k$ address of DIF FFT can also be attained simply.

Figure 3:
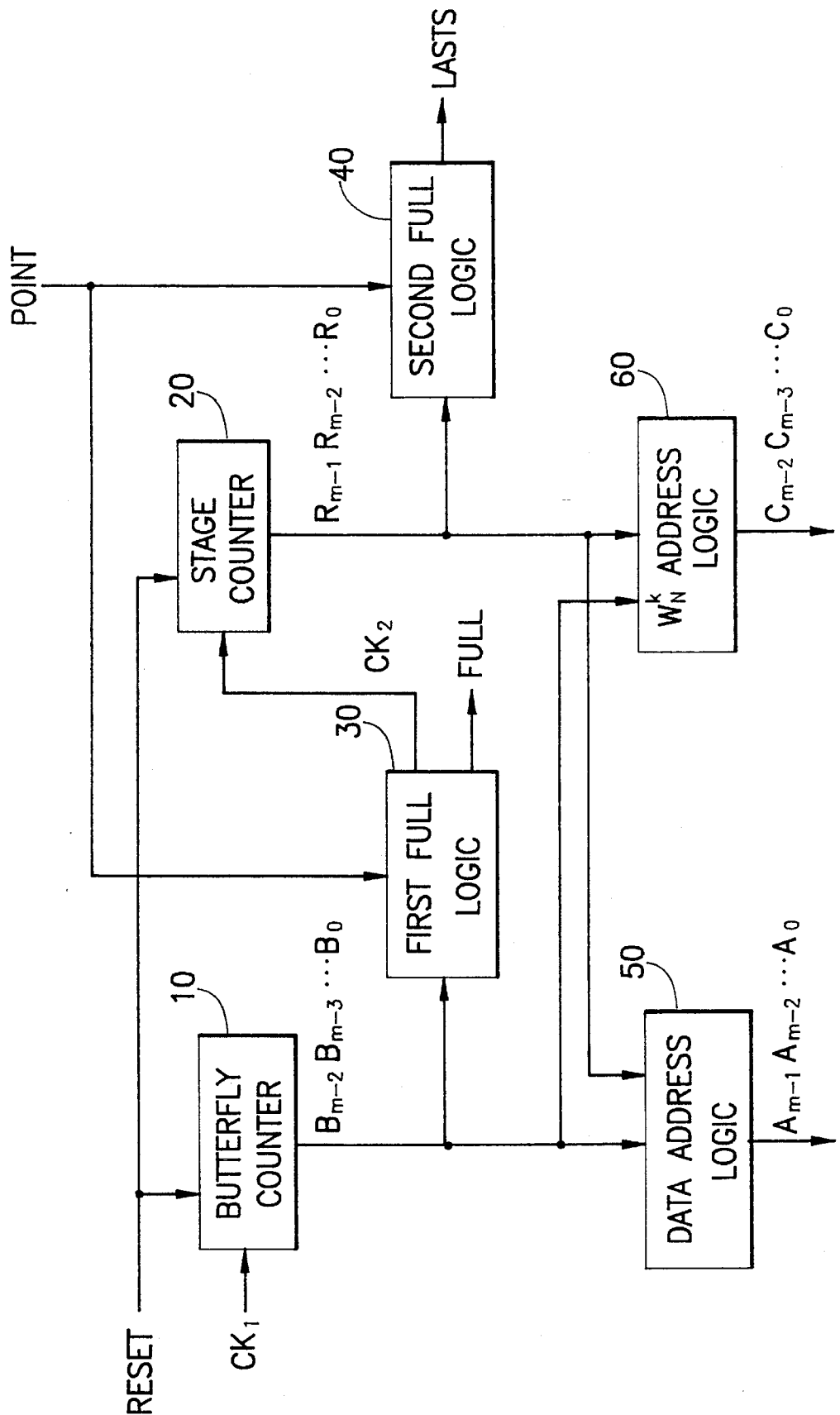
FIG. 3 is a schematic block diagram of an FFT address generator according to one preferred embodiment of the present invention.

Following to the address generation logic described above, an address generator for an FFT processor is designed and shown in FIG. 3, according to one preferred embodiment of the present invention. The address generator for the FFT processor includes a butterfly counter 10, a stage counter 20, a first full logic or butterfly full logic 30, a second full logic or stage full logic 40, a data address logic 50, and a twiddle factor $W_N^k$ address logic 60. The butterfly counter 10 is activated by a clock signal $CK_1$ to count the butterfly count $(B_{m-2}B_{m-3} \ldots B_0)$ for each butterfly stage in numerical sequence, and outputs the butterfly count $(B_{m-2}B_{m-3} \ldots B_0)$ at its output terminals. The butterfly counter 10 may be implemented by any suitable counter. The first full logic 30 is coupled to the butterfly counter 10 to receive the butterfly count $(B_{m-2} B_{m-3} \ldots B_0)$, and is used to generate a full signal FULL and a clock signal $CK_2$ at its output terminals. When all bits of the butterfly count are −1," the full signal FULL goes high to flag the last butterfly calculation in a certain butterfly stage, and the clock signal $CK_2$ also goes high. The stage counter 20 is coupled to the first full logic 30, and is activated by the clock signal $CK_2$ to count the stage count $(R_{m-1}R_{m-2} \ldots R_0)$ in bit-shifting manner, and outputs the stage count $(R_{m-1}R_{m-2} \ldots R_0)$ at its output terminals. The stage counter 20 may be implemented by any suitable shift register. The second full logic 40 is coupled to the stage counter 20 to receive the stage count $(R_{m-1}R_{m-2} \ldots R_0)$, and is used to generate a last signal LASTS at its output terminal. When the most significant bit of the stage count turns to "1", the last signal LASTS goes high to flag the last stage of decimation during the transform.

The data address logic 50 is coupled to the butterfly counter 10 and the stage counter 20 to receive the butterfly count $(B_{m-2}B_{m-3} \ldots B_0)$ and the stage count $(R_{m-1}R_{m-2} \ldots R_0)$, and performs the data address generation logic expressed by the above-described equation (3) to generate the data address $(A_{m-1}A_{m-2} \ldots A_0)$ at its output terminals. The twiddle factor address logic 60 is coupled to the butterfly counter 10 and the stage counter 20 to receive the butterfly count $(B_{m-2}B_{m-3} \ldots B_0)$ and the stage count $(R_{m-1}R_{m-2} \ldots R_0)$, and performs the $W_N^k$ address generation logic expressed by the above-described equation (4) to generate the twiddle factor address $(C_{m-2}C_{m-3} \ldots C_0)$ at its output terminals.

A reset signal RESET may be connected to the butterfly counter 10 and the stage counter 20 in order to reset the butterfly count $(B_{m-2}B_{m-3} \ldots B_0)$ and the stage count $(R_{m-1}R_{m-2} \ldots R_0)$. An FFT point signal POINT indicating the transform length of FFT may be connected to the first full logic 30 and the second full logic 40 to control the limit values of both full logic 30 and 40.

In order to adapt both of the DIT and DIF FFT algorithms, the data address logic 50 may include a bit-reversing mechanism for reversing the bits of the stage count $(R_{m-1}R_{m-2} \ldots R_0)$ before performing the data address generation logic, i.e. Eq. (3), in case of the DIF FFT. The twiddle factor address logic 60 may also include a bit-reversing mechanism for reversing the bits of the butterfly count $(B_{m-2}B_{m-3} \ldots B_0)$ before performing the twiddle factor address generation logic, i.e. Eq. (4), in the case of the DIF FFT.

Figure 4:
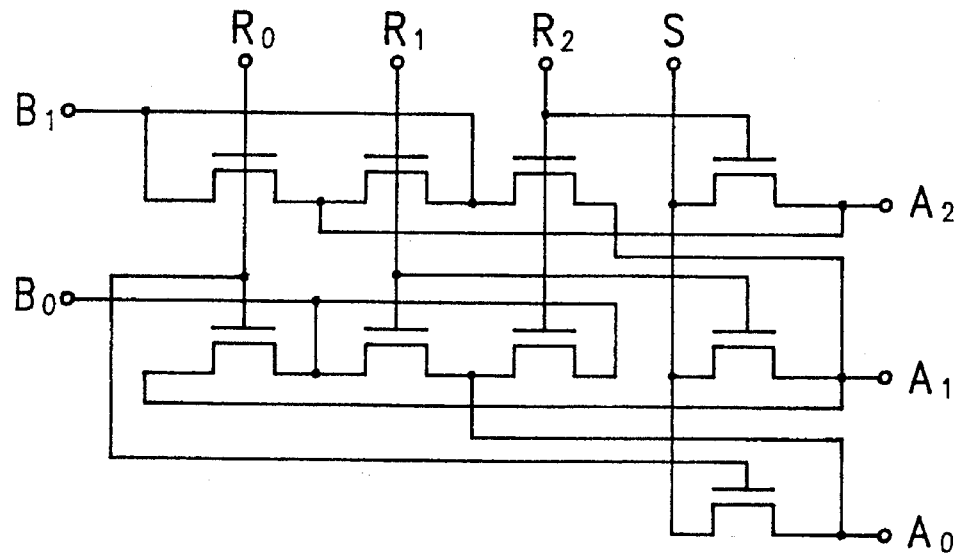
FIG. 4 is a schematic electronic circuit diagram of a data address logic able to be used in the FFT address generator of FIG. 3.
Figure 5:
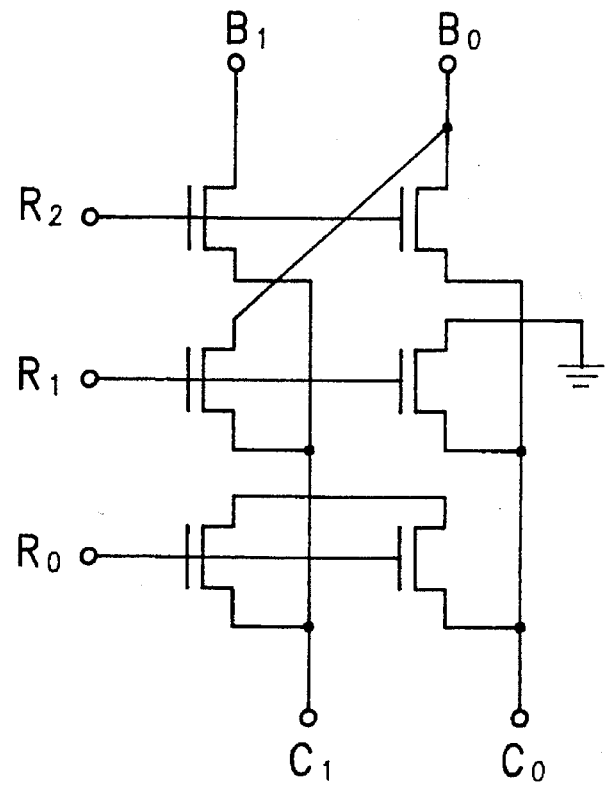
FIG. 5 is a schematic electronic circuit diagram of a twiddle factor address logic able to be used in the FFT address generator of FIG. 3.

In terms of circuit design, for the logic mechanisms of the data and twiddle factor address generation, it is convenient to utilize a MOS (Metal-Oxide-Semiconductor) pass-transistor array. This structure is similar to the barrel shifter. After a study of the address generation logic of equations (1), (2), (3), and (4), it will be found that all logic functions are a summation of two-variable-multiplication items. In addition, all multiplication items include a logic variable $R_i$ (i=0~m−1), and only one in the $R_i$ (i=0~m−1) will be high in all conditions. Therefore, use of a pass-transistor array is suitable for the address generation logic of Eqs. (1), (2), (3), and (4). For example, FIG. 4 shows an electrical circuit consisting of an array of nine NMOS (N-channel MOS) transistors which is able to implement the data address logic 50 for Eq. (1). FIG. 5 shows an electrical circuit consisting of an array of six NMOS transistors that is able to implement the twiddle factor address logic 60 for Eq. (2). As clearly seen in FIGS. 4 and 5, the logic variables $R_i$ (i−0~2) are connected to control the gate electrodes of the transistors, and the logic variables $B_j$ (j=0~1) and S are connected to the source/drain electrodes of the transistors to achieve the logic functions of Eqs. (1) and (2). It should be understood by those skilled in the art that the electrical circuits of FIGS. 4 and 5 can be simply expanded to achieve the logic functions of Eqs. (3) and (4) for FFT of $2^m$ points. Such a pass-transistor array logic circuit greatly simplifies the implementation of the address generation logic of the present invention and decreases the number of transistors while reducing the propagation delay time.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An address generator for a $2^m$-point FFT comprising:
   a butterfly counting mechanism for counting a butterfly count $(B_{m-2}B_{m-3} \ldots B_0)$ for each butterfly stage of FFT in numerical sequence;

a stage counting mechanism for counting a stage count $(R_{m-1}R_{m-2} \ldots R_0)$ for the butterfly stage of FFT in bit-shifting manner;

a data address logic mechanism, coupled to said butterfly counting mechanism and said stage counting mechanism, for receiving said butterfly count $(B_{m-2}B_{m-3} \ldots B_0)$ and said stage count $(R_{m-1}R_{m-2} \ldots R_0)$, and for generating a data address $(A_{m-1}A_{m-2} \ldots A_0)$ according to a first predetermined logic function:

$$\begin{cases} A_{m-1} = R_{m-1}S + (R_{m-2}+R_{m-3}+\ldots+R_0)B_{m-2} \\ \vdots \\ A_{m-k} = (R_{m-1}+\ldots+R_{m-k+1})B_{m-k} + R_{m-k}S + \\ \qquad (R_{m-k-1}+\ldots+R_0)B_{m-k-1} \\ \vdots \\ A_0 = (R_{m-1}+R_{m-2}+\ldots+R_1)B_0 + R_0S \end{cases}$$

wherein S is a select signal for the upper/lower data addresses in a butterfly of FFT; and a twiddle factor address logic mechanism, coupled to said butterfly counting mechanism and said stage counting mechanism for receiving said butterfly count $(B_{m-2}B_{m-3} \ldots B_0)$ and said stage count $(R_{m-1}R_{m-2} \ldots R_0)$, and for generating a twiddle factor address $(C_{m-2}C_{m-3} \ldots C_0)$ according to a second predetermined logic function:

$(C_{m-2}C_{m-3} \ldots C_0) = R_0(000 \ldots 0) + R_1(B_000 \ldots 0) + R_2(B_1B_00 \ldots 0) + \ldots + R_{m-1}(B_{m-2}B_{m-3}B_{m-4} \ldots B_0)$ 2. The FFT address generator as claimed in claim 1, wherein said data address logic mechanism includes bit-reversing mechanism for reversing the bits of said stage count $(R_{m-1}R_{m-2} \ldots R_0)$ before performing the data address generation logic according to said first predetermined logic function, in case of the decimation-in-frequency FFT; and wherein said twiddle factor address logic mechanism includes bit-reversing mechanism for reversing the bits of the butterfly count $(B_{m-2}B_{m-3} \ldots B_0)$ before performing the twiddle factor address generation logic function according to said second predetermined logic, in case of the DIF FFT.

3. The FFT address generator as claimed in claim 2, further comprising a butterfly full logic mechanism, coupled to said butterfly counting mechanism, for receiving said butterfly count $(B_{m-2}B_{m-3} \ldots B_0)$, and for generating a full signal to flag the last butterfly calculation in a certain butterfly stage of FFT.

4. The FFT address generator as claimed in claim 3, further comprising a stage full logic mechanism, coupled to said stage counting mechanism, for receiving said stage count $(R_{m-1}R_{m-2} \ldots R_0)$, and for generating a last signal to flag the last butterfly stage of FFT.

5. The FFT address generator as claimed in claim 4, wherein said data address logic mechanism utilizes a pass-transistor array structure to implement said first predetermined logic function.

6. The FFT address generator as claimed in claim 4, wherein said twiddle factor address logic mechanism utilizes a pass-transistor array structure to implement said second predetermined logic function.

* * * * *